United States Patent
Koifman et al.

(10) Patent No.: US 8,934,090 B2
(45) Date of Patent: Jan. 13, 2015

(54) EVALUATION OF OPTICAL FIBER INTEGRITY

(75) Inventors: Igal Koifman, Hadera (IL); Arkady Khachaturov, Haifa (IL); Uri Voitsechov, Moshav Amirim (IL)

(73) Assignee: Lumenis Ltd. (IL)

( * ) Notice: Subject to any disclaimer, the term of this patent is extended or adjusted under 35 U.S.C. 154(b) by 229 days.

(21) Appl. No.: 13/416,503

(22) Filed: Mar. 9, 2012

(65) Prior Publication Data
US 2013/0235369 A1    Sep. 12, 2013

(51) Int. Cl.
*G01N 21/00*    (2006.01)
(52) U.S. Cl.
USPC ............................................. 356/73.1
(58) Field of Classification Search
USPC ................... 356/73.1; 398/9, 25–38
See application file for complete search history.

(56) References Cited

U.S. PATENT DOCUMENTS

| | | | | | |
|---|---|---|---|---|---|
| 5,056,915 | A | * | 10/1991 | Curtis | 250/227.25 |
| 5,219,345 | A | * | 6/1993 | Potter | 606/15 |
| 5,270,537 | A | * | 12/1993 | Jacobs | 250/227.15 |
| 5,965,877 | A | * | 10/1999 | Wood et al. | 250/227.15 |

\* cited by examiner

*Primary Examiner* — Kara E Geisel
*Assistant Examiner* — Hina F Ayub
(74) *Attorney, Agent, or Firm* — ISUS Intellectual Property PLLC

(57) ABSTRACT

A method of evaluating integrity of a fiber comprises transmitting a measurement light beam through the optical fiber and measuring an intensity of a combined reflection of the measurement light beam. The combined reflection includes a proximal end reflection component and a distal end reflection component. The method further comprises separating the proximal end reflection component from the combined reflection to obtain a calibrated intensity measurement; and analyzing the calibrated intensity measurement to determine the integrity of the optical fiber.

6 Claims, 8 Drawing Sheets

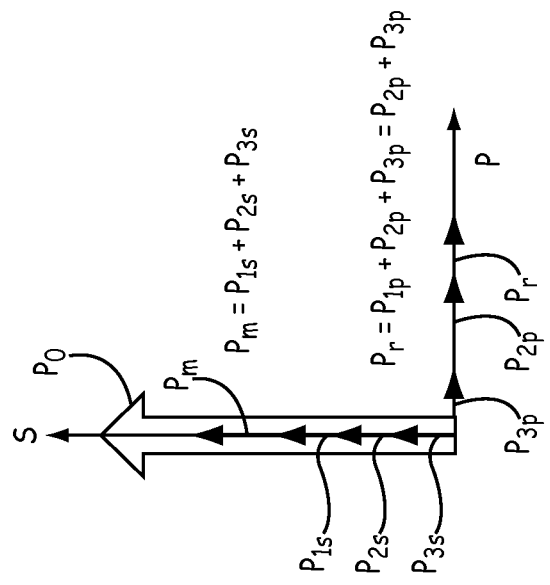
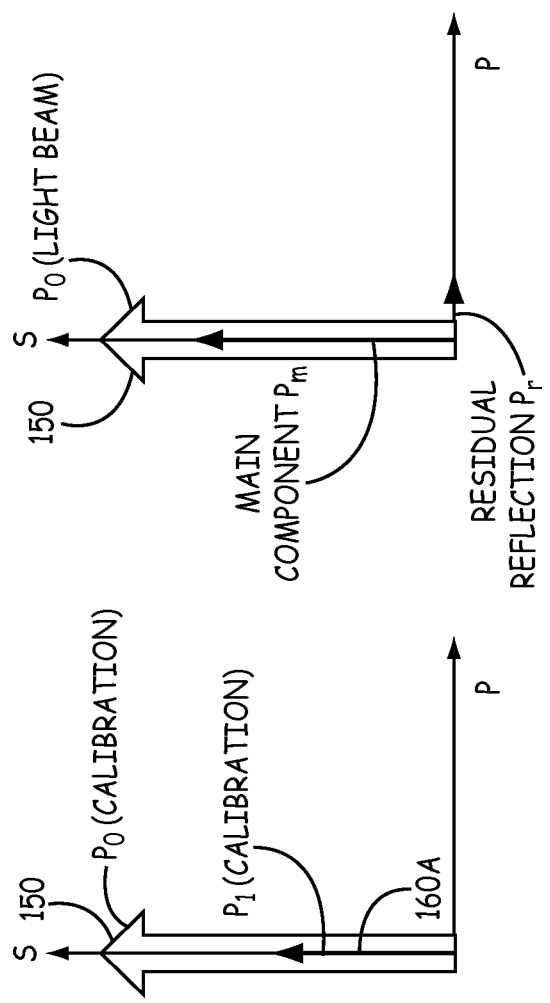
FIG. 3A    FIG. 3B    FIG. 3C

EVALUATION OF OPTICAL FIBER INTEGRITY

BACKGROUND

FIG. 1 illustrates reflection in an optical fiber system according to prior art. A light beam 150 propagating through optical fiber 105 may create the following reflections: a reflection 91 from a proximal fiber end 129, having an intensity p1, a reflection 92A (with intensity p2') from a distal end 121 of fiber 105 that propagates backwards through fiber 105 and emerges at proximal end 121 as reflection 92 having an intensity p2, and a reflection 93A from an environment 90 of the fiber's distal end 121, that re-enters fiber 105 through distal end 121, and propagates through fiber 105 to exit as reflection 93 with intensity p3. Overall reflection 160 at proximal end 129 may comprise reflections from proximal end 129, distal end 121 and environment 90 (91, 92 and 93 respectively). Overall reflection 161 from distal end 121 of fiber 105 comprises reflection 92A from distal end 121 itself and re-entering reflection 93 from environment 90 of distal end 121.

This theoretical separation of reflection components is very difficult to turn into a real optical separation in practice as reflected light from all sources is measured simultaneously as reflection 160.

SUMMARY

In one embodiment, a method of evaluating integrity of a fiber is provided. The method comprises transmitting a measurement light beam through the optical fiber and measuring an intensity of a combined reflection of the measurement light beam. The combined reflection includes a proximal end reflection component and a distal end reflection component. The method further comprises separating the proximal end reflection component from the combined reflection to obtain a calibrated intensity measurement; and analyzing the calibrated intensity measurement to determine the integrity of the optical fiber.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIGS. 3A to 3C are high level exemplary schematic illustrations of the light beams and the reflections in relation to their polarization states.

DETAILED DESCRIPTION

Figure 1:
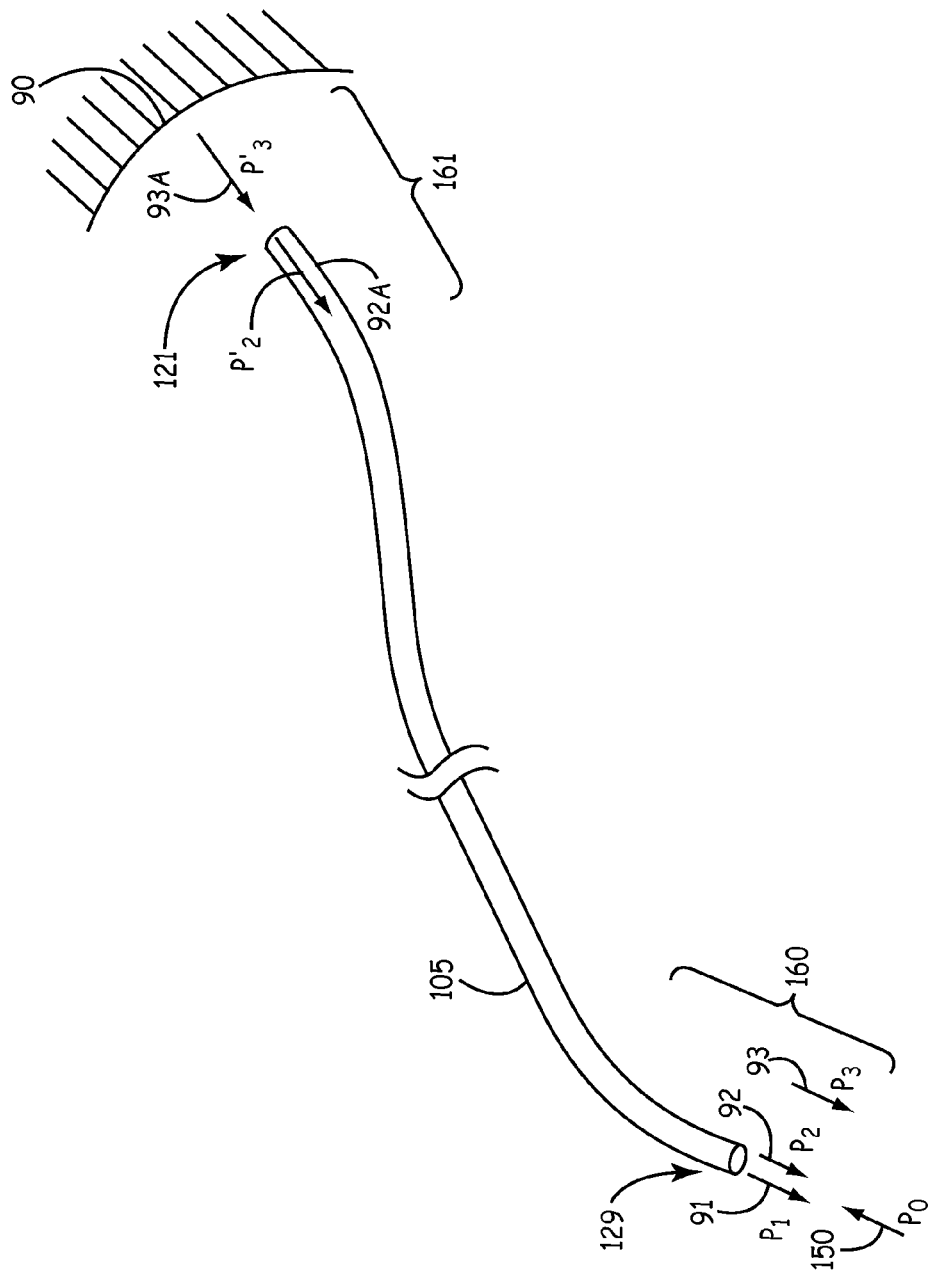
FIG. 1 illustrates reflections in a conventional optical fiber system.

Prior to setting forth the detailed description, it may be helpful to set forth definitions of certain terms that will be used hereinafter.

The term "laser" as used herein in this application refers to any type of laser—For example solid state (e.g. Neodymium, Erbium, Holmium, Thulium or Alexandrite), diode (e.g. in various wavelengths, such as in the range 532-1600 nm), gas (e.g. Argon) or fiber laser (e.g. Neodymium, Erbium, Holmium, Thulium or Alexandrite). Furthermore, laser beams referred to in the application may be continuous, pulsed, Q-switched, or any other temporal pattern.

The term "treatment beam" as used herein in this application refers to a laser beam transferred through an optical fiber to treat a target tissue. For example, a treatment beam may be a pulsed laser beam or any other laser beam as defined above. The treatment may be ablative or non-ablative, as determined by the beam characteristics, such as intensity in respect to a tissue ablation threshold of approximately 10 kW/cm2.

The term "measurement beam" as used herein in this application refers to a light beam that is used to estimate fiber integrity in any one of the aspects described in the disclosure. The measurement beam may be a low energy beam that is not configured to provide treatment or it may be a non-ablative treatment beam that is used to evaluate fiber integrity. The measurement beam may be generated, for example, by the same laser source which generates the treatment beam or by another laser source. The measurement beam may be transmitted to the tissue during the treatment or during interruptions in the treatment, such as between pulses of a pulsed treatment beam.

The term "light beam" as used herein in this application refers to any light beam transferred through an optical fiber and may refer to either the measurement beam or the treatment beam, as well as to a single beam with temporally varying characteristics, such as to alternately function as a treatment beam and as a measurement beam. The terms light beam and laser beam are used interchangeably herein. Any of the beams referred to in the application may be a laser beam, as defined above.

The term "fiber integrity" as used herein in this application refers to an estimation of damages inflicted on the fiber, especially of the fiber tip, during its operation and manipulation through body fluids and tissues, or during storage and handling prior or after actual operation. The estimation is used to determine if a fiber is operable or damaged, as well as to assess a degree of damage.

The term "proximal end of the optical fiber" as used herein in this application refers to the fiber end through which the light beam enters the fiber and propagates towards the distal end of the fiber, which is close to the treated tissue. Reference to measurements carried out at the proximal end relate to the vicinity of the proximal end, e.g. may be carried out by optical equipment coupled to the proximal end, or by equipment receiving beams diverted from the proximal end. Similarly, reference to the distal end relate to the vicinity of the distal end of the fiber.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 2A:
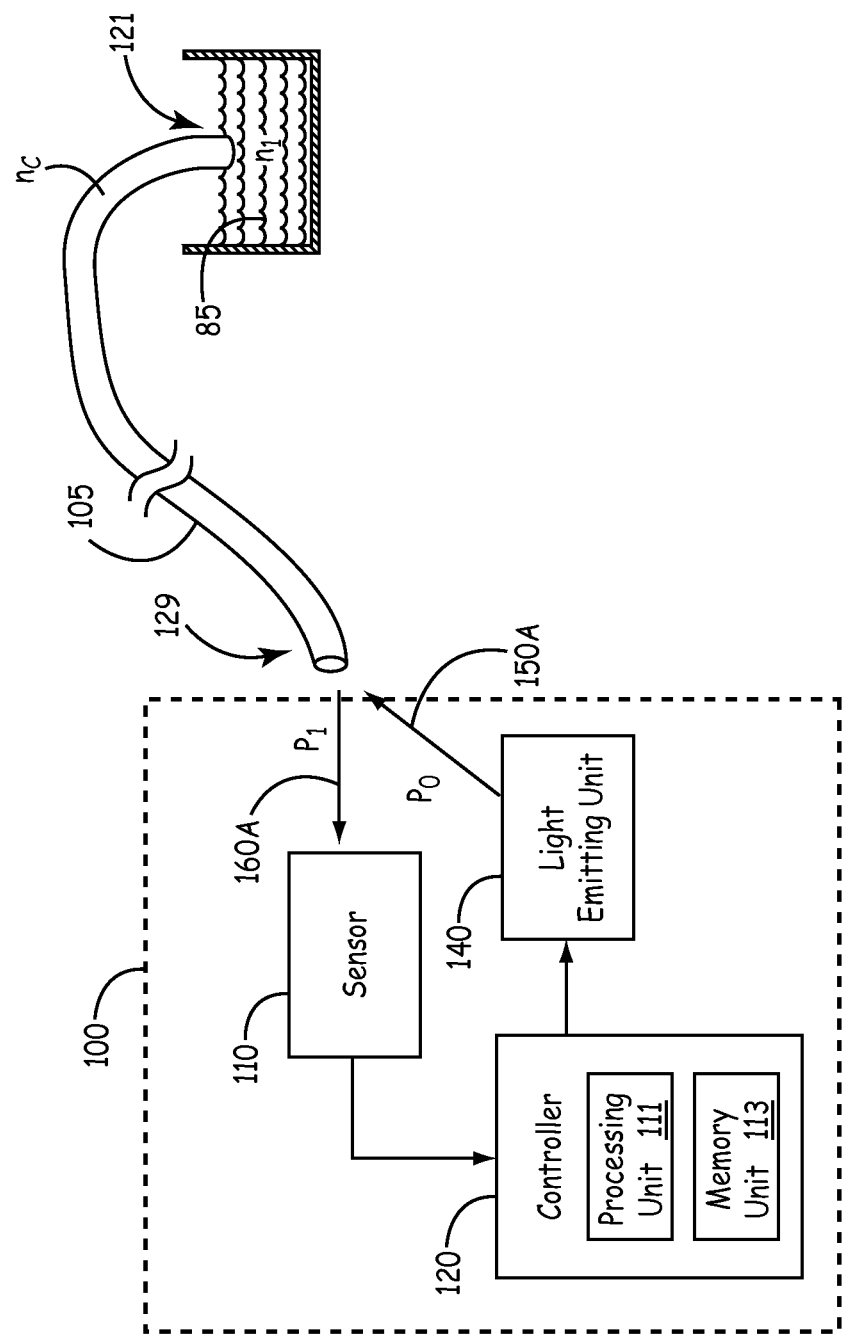
FIGS. 2A to 2C are high level schematic illustrations of embodiments of a system for evaluating optical fiber integrity.
Figure 2B:
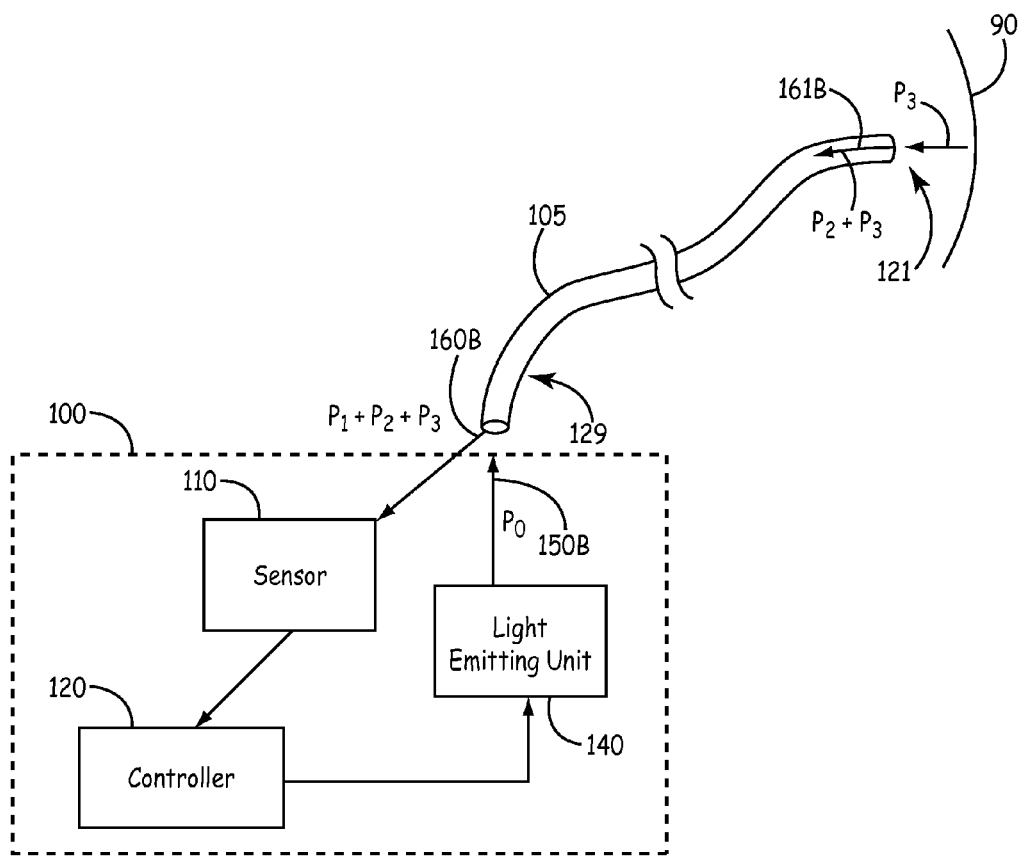
Figure 2C:
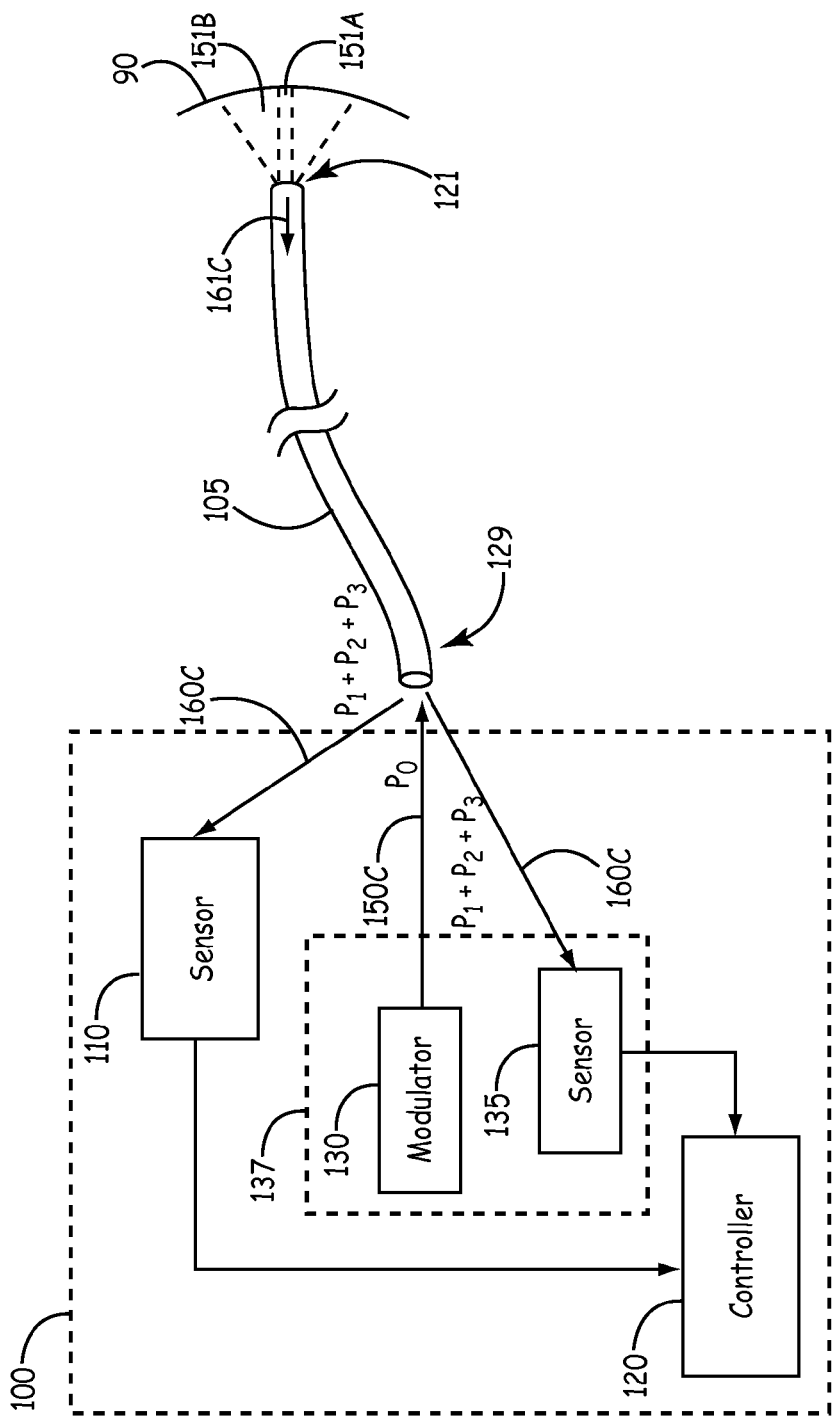

FIGS. 2A-2C are high level schematic illustrations of embodiments of a system 100 for evaluating optical fiber integrity. It is to be understood that the exemplary embodiments and techniques described in each of FIGS. 2A-2C can be implemented separately or together. The various system components in each embodiment may operate simultaneously or sequentially, and reflection 160 may be optically separated to provide input for parallel working components. Light beam 150 and its reflection 160 are denoted as light beams 160A, 150A, 150B and 150C and as reflections 160A, 160B and 160C (correspondingly) to clarify the explanations of FIGS. 2A-2C, respectively, and are not to be taken in a limiting sense.

System 100 in FIG. 2A comprises a controller 120 configured to direct a light emitting unit 140 to transmit a calibration beam 150A into optical fiber 105 with distal end 121 of optical fiber 105 placed in a specified calibration environment. The controller 120 can include one or more processing units and memory units that include or function with software programs, firmware or other computer readable instructions for carrying out various methods, process tasks, calculations, and control functions, used in the fiber integrity evaluation described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

System 100 also includes a sensor 110 configured to measure an intensity of a reflection 160A of the transmitted calibration beam 150A. The controller 120 calibrates a proximal end reflection of optical fiber 105 based on a the measured reflection intensity. The specified calibration environment may be a fluid 85 having a refractive index ($n1$) equal or very close to a refractive index ($nc$) of a core material of the fiber 105. By inserting the distal end 121 into the fluid 85, a distal end reflection (92A in FIG. 1) and environment reflection (93A in FIG. 1) are substantially cancelled. In some embodiments, air may be used as an additional specified calibration environment and proximal end reflection may be calculated with the distal end of the fiber in air.

Since, the distal end reflection and environment reflection are substantially cancelled during calibration, the controller 120 is configured to store and use the detected intensity P1 of the proximal end reflection 160A as a baseline for measurements during treatment. In other words, as shown in FIG. 2B, during treatment, the distal end 121 of the fiber 105 is placed in an operating environment 90, such as an environment surrounded by tissue. The controller 120 directs the light emitting unit 140 to transmit a measurement beam 150B the fiber 105. The sensor 110 measures the intensity of the reflected beam 160B. The reflected beam 160B includes an intensity component from a proximal end reflection (P1), a distal end reflection (P2), and an environment reflection (P3). The controller 120 is configured to subtract out the intensity P1 from the total detected reflection of the measurement beam in order to determine the intensity of the reflection due to distal end and environment reflections based on the measured intensity of the proximal end reflection during calibration as discussed with respect to FIG. 2A. The fiber integrity can then be determined based on the distal end reflection. In particular, in some such embodiments, the contribution due to environment reflections is sufficiently small compared to the distal end reflections that the environment reflections are neglected.

It should be noted that the calibration described above using a calibration environment can be performed at any point in the process of manufacturing the system and/or by a treating physician prior to use of the fiber 105. If a fiber is calibrated using a calibration environment during manufacture of the fiber, the fiber is assigned a unique identification (ID) so that the fiber and corresponding calibration intensity can be identified by the system prior to use. For example, the ID can be included in a radio frequency identification (RFID) tag that is incorporated into the fiber or its connector. The laser system which operates the fiber in the field is configured to read and identify the fiber. In one such embodiment, the RFID also includes the calibration intensity values in addition to the unique ID. These calibration intensity values can include, for example, the nominal proximal end reflection intensity ($p1$) value or an average of a series of measurement of the proximal end reflection intensity.

In other embodiments, the system in which the fiber is being used may measure nominal values of proximal end reflection intensity and store relative numbers which characterize intrinsic features of an individual fiber rather than a specific calibration step. These nominal values, for example, can be in normalized terms. In one such embodiment, the calibration process measures the proximal end reflection, $p1$, and stores the ratio of the transmitted light beam intensity ($p0$) to the intensity of the proximal end reflection ($p1$) as an intrinsic characteristic parameter of the fiber.

Furthermore, it should be noted that, although fiber 105 is depicted as a straight fiber for purposes of explanation, fiber 105 can be implemented using a side-firing fiber known to one of skill in the art.

In addition, in some embodiments, the controller 120 is configured to calculate the intensity of the distal end reflection using two polarization states. For example, proximal end reflections are generally much stronger than distal end reflections ($p1 > p2$). However, while proximal end reflections are at the same polarization state as light beam 150B, distal end reflections are polarized differently than light beam 150, due to the back and forth propagation of the reflections through fiber 105, and hence have both orthogonal polarization components. Hence, in some embodiments, sensor 110 is configured to separate the reflection 160B into polarization states. Reflection 160B includes an intensity P1 due to a proximal end reflection, an intensity P2 due to a distal end reflection, and an intensity P3 due to an environment reflection. Separation of reflection 160B into polarization states enables the detection of the weaker distal end reflection. For example, light beam 150B may be s-polarized, as is the corresponding proximal end reflection, but the distal end reflection has the both s- and p-polarization components due to its motion through the fiber 105.

The controller 120 directs the light emitting unit 140 to transmit the light beam 150B through optical fiber 105, with distal end 121 of optical fiber 105 placed in a specified operating environment 90 (for example, a target tissue or body fluids). The sensor 110 receives the reflection 160B of the transmitted light beam 150B at proximal end 129. The controller 120 is configured to analyze the intensity of both polarization components of reflection 160B in order to calculate a distal end reflection as described in more detail with respect to FIGS. 3A to 3C.

For example, FIGS. 3A to 3C illustrate the light beams and the reflections in relation to their polarization states, according to some exemplary embodiments. In particular, FIG. 3A illustrates an exemplary calibration beam and its reflection (marked as P1) from the proximal end, being both in an s polarization state. In this case, the reflected beam has the same polarization state as the calibration beam. FIG. 3B illustrates the reflection at operation conditions with both proximal end and distal end reflections. The reflection has both an s-state component (main component Pm) and a e-state component (Pr), being a residual reflection caused by the propagation of light beam 150 through the fiber and back. To calculate the distal end reflection (FIG. 3C), the proximal end reflection, P1$s$ in FIG. 3C (having only an s-state component), is calculated from the light beam intensity, according to the results of the calibration measurements as described above (shown in FIG. 3A). The difference between main component Pm in the s-state and the proximal reflection, P1$s$, is the s-state component of the distal end reflection, marked P2$s$ in FIG. 3C, and the environment reflection, marked P3$s$. The residual reflection Pr (the p-state component was exaggerated for illustrative purposes) is the p-state component of the distal end reflection, P2$p$, and the e-state component of the environment reflection, P3$p$. Hence, the s-state component of the reflection can be expressed by equation 1 below.

$$P_m = P_{1s} + P_{2s} + P_{3s}$$ Eq. 1

Similarly, the p-state component of the reflection can be expressed generally by equation 2 below.

$$P_r = P_{1p} + P_{2p} + P_{3p}$$ Eq. 2

Since P1$p$ is equal to zero, Pr can be expressed as the sum of P2$p$ and P3$p$. In addition, in some embodiments, the contribution of the environment reflection is neglected since it is relatively small compared to proximal and distal end reflections. When the environment reflection is neglected, the distal end component, P2, is then calculated by summing up P2$s$ and Pr.

Light beam 150B may be a treatment beam or a measurement beam, and may be used for measurement at interruptions of the treatment—for example between pulses of a pulsed treatment beam, or during interruptions of a continuous treatment beam. In non-ablative treatment, light beam 150 may be the treatment beam itself. Sensor 110 comprises, in some embodiments, polarization-sensitive elements such as polarization beam splitters, active and passive polarizers, Faraday rotators, retardation plates and λ/2 plates, etc.

Thus, the controller 120 is configured to calculate a distal end and environment reflection 161B by: (i) calculating a main polarization component of the distal end reflection intensity having a similar polarization to the light beam by subtracting the reflection intensity of the calibration beam from the main polarization component of the reflected beam, and (ii) calculating a distal end reflection intensity by summing the main polarization component of the distal end reflection intensity and the residual reflection as described above.

The controller 120 is further configured to evaluate an integrity of distal end 121 based on the calculated distal end reflection. For example, in some embodiments, the processing unit 120 compares the calculated distal end reflection intensity to a specified threshold (e.g. damage to distal end 121 may strongly increase distal end reflectance 92A). The specified threshold may be defined, for example, as the distal end reflection of an intact fiber (e.g. new or undamaged) with a certain margin for normal use defects. It should be noted that components and configuration of system 100 presented in FIGS. 2A and 2B are provided by way of example. For example, in other embodiments, more than one sensor is included and the sensor can be incorporated into a single unit with the light emitting unit, as shown in FIG. 2C.

FIG. 2C is a high-level illustration of another embodiment of system 100 which includes a light emitting/receiving unit 137. The unit 137 includes a modulator 130 and a sensor 135 positioned at proximal end 129 of optical fiber 105. The system 100 in the embodiment of FIG. 2C also includes a second sensor 110 and a controller 120. The controller 120 is configured to direct the light emitting/receiving unit 137 to transmit a light beam 150C through fiber 105. In particular, the controller 120 directs the modulator 130 to modulate a numerical aperture of light beam 150C directed at a target tissue in the operating environment 90. Sensor 135 is arranged to measure intensity values (P3) corresponding to reflections of light beam 150C having respective numerical apertures reflected from the target tissue and transmitted backward through optical fiber 105. Therefore, the sensor 135 enables the controller to detect an external reflection intensity (P3) from the target tissue 90.

The measurement of reflection intensity P3 relies on the fact that environment reflections respond differently to different numerical aperture values of light beam 150C. This differentiation allows separation of relatively weak environmental reflection from stronger fiber end reflections 91 and 92 (p3<p2<p1). The measurement principle is described in more detail in WIPO Patent Application No. PCT/IB2011/053307 titled "Distance estimation between a fiber end and a tissue using numerical aperture modulation" filed on Jul. 25, 2011 which is hereby incorporated herein by reference.

In particular, the controller 120 utilizes a derived relation between reflection intensity S(t) and the numerical aperture of the light beam which is provided in equation 3 below.

$$S(t) = F(t)/(1 + d(t)NA(t)/D)2$$ Eq. 3

In equation 1, F(t) is a time dependent function incorporating various geometrical and temporal variation of environment reflection, d(t) is a distance estimation between distal end 121 and a reflecting feature in environment 90, D is fiber core diameter, and NA(t) is the numerical aperture of light beam 150.

When S(t) is measured with light beams having different numerical aperture values over a very short period of time (represented in FIG. 2C as two beams 151A and 151B), it can be assumed that F(t) and d(t) are approximately constant, and the variation in S(t) is only due to the variation in NA(t). Hence, the variation enables the processing unit 120 to differentiate environmental reflection intensity P3 within overall reflection 160C, and subtract it to more accurately calculate distal end reflection intensity P2 from measured reflection 160C.

Accordingly, the controller 120 is arranged to receive the intensity values from sensor 135 and to calculate environmental reflection intensity P3, by comparing intensity values of the reflections associated with two or more numerical aperture values. The controller 120 then subtracts the calculated environmental reflection intensity from the calculated distal end reflection to yield a net distal end reflection. The processing unit 120 then uses the net distal end reflection to evaluate the fiber integrity. The distal end reflection intensity can be calculated by subtracting the proximal end reflection intensity measured during calibration, as described above. In addition, in some embodiments, the sensor 110 is configured to measure both polarization states of the reflection intensity of the reflection 160C, as described above. The controller is configured to calculate the total distal end reflection based on both polarization states, in some embodiments, as described above. It should be noted that the system 100 can include additional components not shown and known to one of skill in the art, such as beam splitters, used in carrying out the operation of the system 100.

Figure 4:
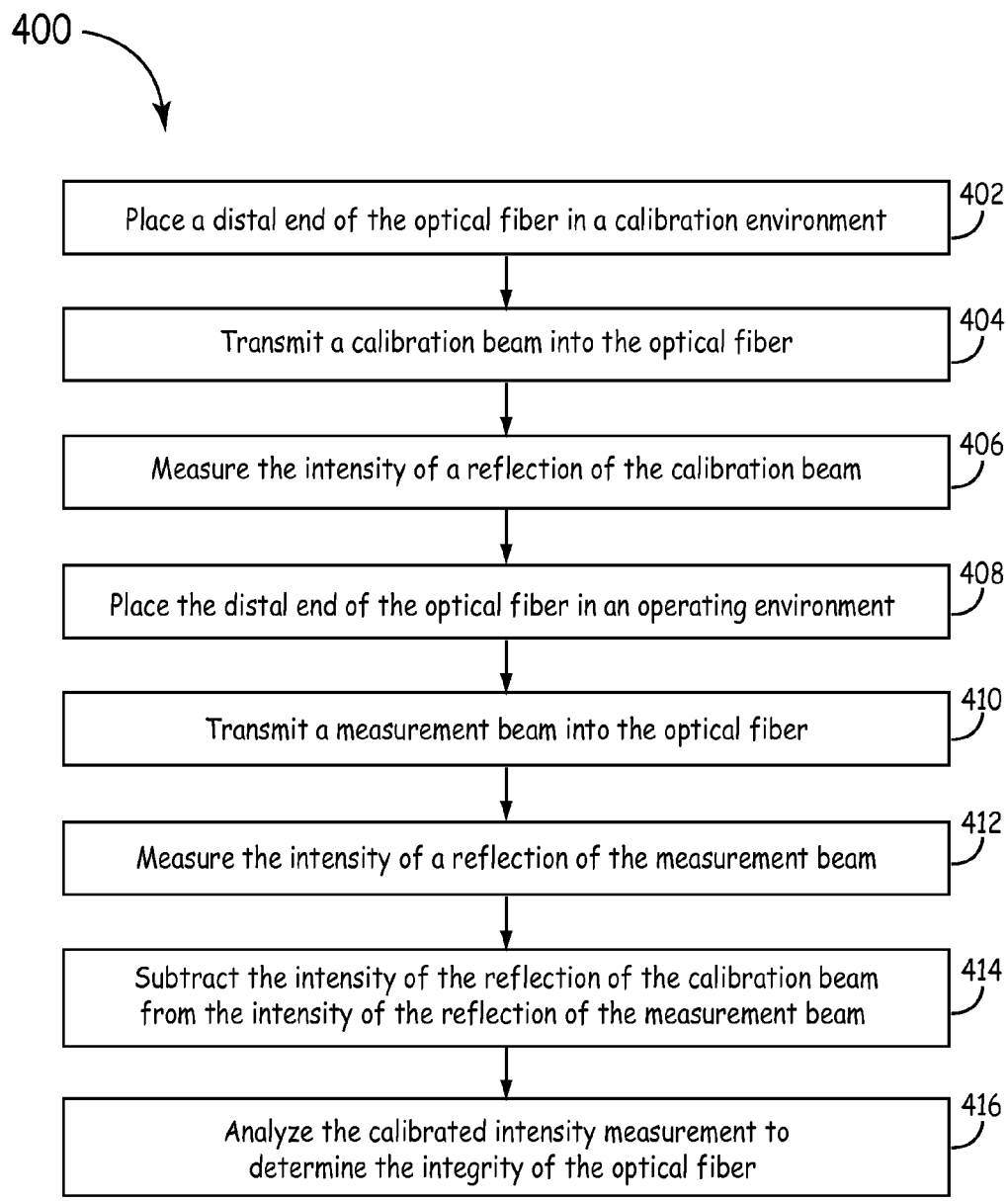
FIG. 4 is a flow chart depicting one embodiment of a method of evaluating optical fiber integrity.

FIG. 4 is a high level flowchart illustrating one embodiment of a method 400 for evaluating optical fiber integrity. Method 400 can be implemented in a system to evaluate optical fiber integrity, such as fiber end integrity. For example, method 400 can be implemented in system 100 described above. At block 402, a distal end of the optical fiber is placed in a calibration environment in which approximately no reflection occurs on the distal end of the fiber. For example, in some embodiments, the distal end of the optical fiber can be immersed in a fluid having a refractive index equal to a refractive index of a fiber core material in the optical fiber. In other embodiments, the calibration environment is air.

At block 404, a calibration beam is transmitted into the optical fiber. At block 406, the intensity of a reflection of the calibration beam is measured, such as with the sensor 110 described above. At block 408, the distal end of the optical fiber is placed in an operating environment. At block 410, a measurement beam is transmitted into the optical fiber. At block 412, the intensity of the reflection of the measurement beam is measured. At block 414, the intensity of the reflection of the calibration beam is subtracted from the intensity of the reflection of the measurement beam. In this manner a reflection from the distal end of the fiber is separated from a reflection from the proximal end of the fiber. The reflection from the distal end of the fiber is related to the fiber integrity. Hence, the resultant intensity measurement after subtracting out the intensity of the calibration beam reflection is referred to herein as a calibrated intensity measurement. At block 416, the calibrated intensity measurement is analyzed to determine the integrity of the optical fiber. For example, the calibrated intensity measurement is compared to a threshold, in some embodiments. The threshold can be determined based on intensity measurements for new or still operative fibers.

Figure 5:
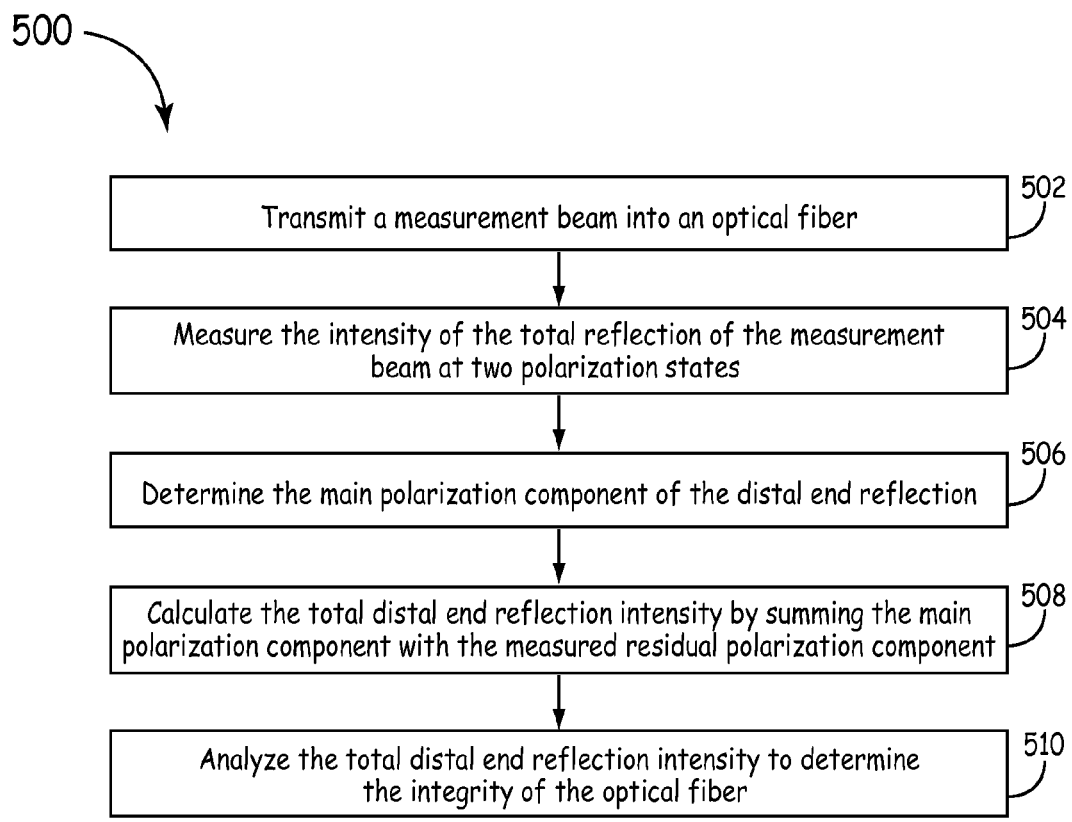
FIG. 5 is a flow chart depicting another embodiment of a method of evaluating optical fiber integrity

FIG. 5 is a flow chart illustrating another embodiment of a method 500 of evaluating optical fiber integrity. Method 500 can be implemented, for example, in a system such as system 100. At block 502, a measurement beam is transmitted into the optical fiber. At block 504, the intensity of the total reflection of the measurement beam is measured at two polarization states. For example, the polarization states may be selected as a linear polarization state of the measurement light beam and an orthogonal polarization state (e.g. s-state and p-state). The polarization states can be separated from one another using polarization-sensitive elements such as beam splitters, active and passive polarizer, Faraday rotators, or retardation plates. The proximal end reflection has the same polarization state as the light beam because it does not enter into the fiber, while the distal end reflection has a somewhat different polarization state including a certain orthogonal component, as a result of its propagation through the optical fiber. The component of the distal end reflection having the same polarization state as the original measurement beam is referred to herein as the main polarization component. The orthogonal component of the distal end reflection is also referred to herein as the residual polarization component.

At block 506, the main polarization component of the distal end reflection is determined. For example, the main polarization component is determined in some embodiments, by subtracting the intensity of the proximal end reflection from the intensity of the total reflection. The intensity of the proximal end reflection can be determined using the techniques described above with respect to method 400. For example, blocks 402 to 406 can be performed during the manufacture of the optical fiber to measure an intensity calibration due to the proximal end reflection. The resulting intensity calibration can be provided with the fiber and entered into the system prior to use of the optical fiber. Alternatively, a medical professional can direct the acts of blocks 402 to 406 to be performed prior to use of the fiber in order to calibrate the system with the measured intensity calibration.

At block 508, the calibrated intensity measurement or total distal end reflection intensity is calculated by summing the main polarization component with the measured residual polarization component of the distal end reflection. At block 510, the total distal end reflection intensity is analyzed to determine the integrity of the optical fiber. For example, the total distal end reflection is compared to a threshold, in some embodiments. One advantage of method 500 is that a dynamic range of the measured reflection intensity could be significantly increased, which can improve performance.

Figure 6:
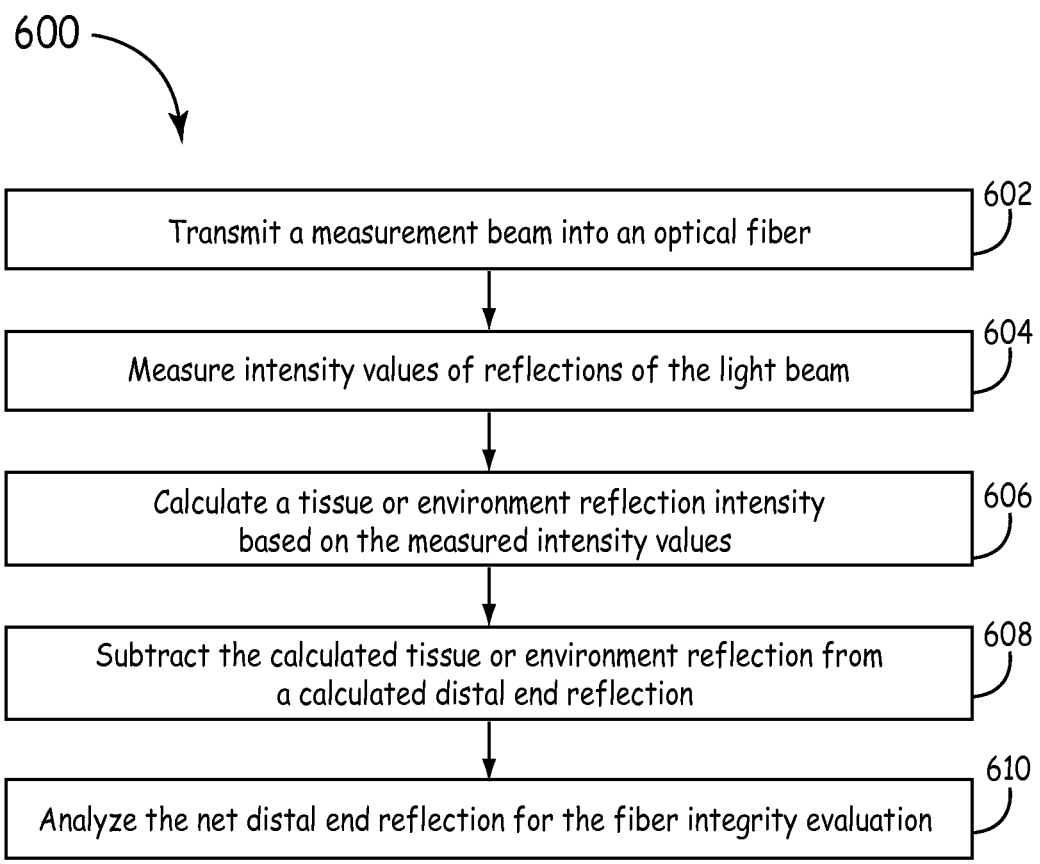
FIG. 6 is a flow chart depicting another embodiment of a method of evaluating optical fiber integrity.

FIG. 6 is a flow chart illustrating another embodiment of a method 600 of evaluating optical fiber integrity. Method 600 can be implemented in a system such as system 100 described above. At block 602, a measurement beam is transmitted into the optical fiber. In particular, a numerical aperture of the measurement beam is modulated as described above. At block 604, intensity values of reflections of the light beam reflected from the target tissue and transmitted backward through the optical fiber are measured. The measured intensity values correspond to the modulations of the numerical aperture of the measurement beam. At block 606, a tissue or environment reflection intensity is calculated based on the measured intensity values. For example, the environment reflection intensity is calculated in some embodiments by comparing intensity values of the reflections associated with two or more numerical aperture values, as described above.

At block 608, the calculated tissue or environment reflection is subtracted from a calculated distal end reflection to obtain a net distal end reflection. For example, in some embodiments, the distal end reflection is calculated based on a measurement of a proximal end reflection during a calibration process as described above with respect to method 400. In addition, in other embodiments, the distal end reflection calculation is based on the calibration process described in method 400 as well as a measurement of the reflection intensity in both polarization states as described in method 500. At block 610, the net distal end reflection is analyzed for the fiber integrity evaluation as described above.

Method 600 may be carried out alternately with applying a laser treatment through the fiber, For example, method 600 may be carried out between pulses of a pulsed laser treatment. Alternatively, the measurement of the distal end reflection may be carried out by the treatment beam as the light beam, especially in non-ablative treatments and when the treatment beam is continuous.

Hence, the embodiments described above enable evaluation of fiber integrity on-line during use of the optic fiber in delivering light (laser) radiation to an area of tissue or skin for treatment as environment 90. Each method described above can be implemented separately or in combination with one or more of the other methods. The evaluation methods do not require changes to the fiber design, and employ light laser beam 150 for integrity evaluation.

For example, in order to achieve on-line evaluations (e.g. during lasing) about optic fiber tip integrity, the methods described above include measuring the (laser) light power reflected from fiber distal end 121 (the working part of the fiber; increased reflection indicates some degradation). Method 400 provides one technique for separating the distal end reflection from the reflection on proximal end of fiber by making preliminary fiber calibrations, including placing the fiber distal end into a solvent 85, which has a refractive index n1 equal (or very close) to a refractive index, nc, of the fiber core material. As distal end reflection is reduced or eliminated by placing the distal end in the solvent, the measured signal represents the full reflection from the proximal end. An additional measurement, when fiber tip 121 is in air, may be used to scale the normal fiber tip reflection. The measurement of the proximal end reflection is then used as a baseline to measure the distal end reflection during treatment.

In the above description, an embodiment is an example or implementation. The various appearances of one "embodiment", "an embodiment", "embodiments" or "some embodiments" do not necessarily all refer to the same embodiments.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of evaluating integrity of an optical fiber, the method comprising transmitting a measurement light beam through the optical fiber;
    measuring an intensity of a combined reflection of the measurement light beam; the combined reflection including a proximal end reflection component and a distal end reflection component;
    separating the proximal end reflection component from the combined reflection to obtain a calibrated intensity measurement;
    analyzing the calibrated intensity measurement to determine the integrity of the optical fiber;
    wherein separating the proximal end reflection component from the combined reflection comprises determining a calibration intensity corresponding to the proximal end reflection component and subtracting the calibration intensity from the intensity of the combined reflection to obtain the calibrated intensity measurement; and,
    wherein measuring the intensity of the combined reflection comprises measuring the intensity of the combined reflection at a first polarization state and a second polarization state;
    wherein subtracting the calibration intensity from the intensity of the combined reflection obtains a distal end reflection component at the first polarization state;
    the method further comprising combining the distal end reflection component at the first polarization state with the intensity of the combined reflection measured at the second polarization state to obtain the calibrated intensity measurement.

2. A method of evaluating integrity of an optical fiber, the method comprising transmitting a measurement light beam through the optical fiber;
    measuring an intensity of a combined reflection of the measurement light beam; the combined reflection including a proximal end reflection component and a distal end reflection component;
    separating the proximal end reflection component from the combined reflection to obtain a calibrated intensity measurement;
    analyzing the calibrated intensity measurement to determine the integrity of the optical fiber;
    wherein separating the proximal end reflection component from the combined reflection comprises determining a calibration intensity corresponding to the proximal end reflection component and subtracting the calibration intensity from the intensity of the combined reflection to obtain the calibrated intensity measurement; and,
    wherein transmitting the measurement beam through the optical fiber comprises modulating the measurement beam with each of a plurality of numerical apertures;
    wherein measuring an intensity of a combined reflection comprises taking a plurality of measurements of the intensity of the combined reflection, each measured intensity corresponding to one of the plurality of numerical apertures;
    the method further comprising:
    comparing the plurality of measured intensities with one another to determine an intensity of an environment reflection component; and
    subtracting the intensity of the environment reflection component, in addition to the calibration intensity, from the intensity of the combined reflection to obtain the calibrated intensity measurement.

3. A system for evaluating optical fiber integrity, comprising:
    a light emitting unit configured to transmit a light beam through an optical fiber;
    a controller configured to direct the light emitting unit to transmit the light beam; and,
    a sensor configured to measure an intensity of a reflection of the light beam;
    wherein the controller is further configured to obtain a calibrated intensity measurement of the reflection by removing a proximal end component form the measurement of intensity of the reflection received from the sensor; the controller further configured to analyze the calibrated intensity measurement to determine the integrity of the optical fiber;
    wherein the controller is configured to store a calibration intensity measured while the distal end of the optical fiber is located in a calibration environment in which approximately no reflection occurs on the distal end of the optical fiber;
    wherein the controller is configured to subtract the stored calibration intensity from the measured intensity of the reflection to remove the proximal end component from the measurement of intensity of the reflection received from the sensor; the stored calibration intensity corresponding to the proximal end component; and,
    wherein the sensor is configured to measure the intensity of the reflection of the light beam at a first polarization state and a second polarization state;
    wherein the controller is configured to subtract the stored calibration intensity from the measurement of intensity of the reflection of the light beam to obtain a distal end component at the first polarization state;
    wherein the controller is configured to combine the intensity of the reflection at the second polarization state with the distal end component at the first polarization state to obtain the calibrated intensity measurement.

4. A system for evaluating optical fiber integrity, comprising:
    a light emitting unit configured to transmit a light beam through an optical fiber;

a controller configured to direct the light emitting unit to transmit the light beam; and, a sensor configured to measure an intensity of a reflection of the light beam;

wherein the controller is further configured to obtain a calibrated intensity measurement of the reflection by removing a proximal end component form the measurement of intensity of the reflection received from the sensor; the controller further configured to analyze the calibrated intensity measurement to determine the integrity of the optical fiber; and, wherein the controller is configured to direct the light emitting unit to modulate a numerical aperture of the transmitted light beam;

wherein the controller is further configured to determine an intensity of an environment component of the reflection of the light beam by comparing a plurality of intensity measurements of the reflection of the light beam, the plurality of intensity measurements corresponding to the modulation of the numerical aperture;

wherein the controller is further configured to obtain the calibrated intensity measurement by subtracting the intensity of the environment component from the intensity of the reflection of the light beam received from the sensor.

5. A program product comprising a non-transitory processor-readable medium on which program instructions are embodied, wherein the program instructions are configured, when executed by at least one programmable processor, to cause the at least one programmable processor to:

direct the light emitting unit to transmit a light beam through an optical fiber;

remove a proximal end component from the measurement of intensity of a reflection of the transmitted light beam to obtain a calibrated intensity measurement; and analyze the calibrated intensity measurement to determine integrity of the optical; fiber; and, wherein the program instructions are further configured to cause the at least one programmable processor to:

subtract a stored calibration intensity from the intensity of the reflection of the light beam to obtain a distal end component at a first polarization state, the stored calibration intensity corresponding to the proximal end component; and combine the intensity of the reflection measured at a second polarization state with the distal end component at the first polarization state to obtain the calibrated intensity measurement.

6. A program product comprising a non-transitory processor-readable medium on which program instructions are embodied, wherein the program instructions are configured, when executed by at least one programmable processor, to cause the at least one programmable processor to:

direct the light emitting unit to transmit a light beam through an optical fiber;

remove a proximal end component from the measurement of intensity of a reflection of the transmitted light beam to obtain a calibrated intensity measurement; and analyze the calibrated intensity measurement to determine integrity of the optical; fiber; and, wherein the program instructions are further configured to cause the at least one programmable processor to:

direct the light emitting unit to modulate a numerical aperture of the transmitted light beam;

determine an intensity of an environment component of the reflection of the light beam by comparing a plurality of intensity measurements of the reflection of the light beam, the plurality of intensity measurements corresponding to the modulation of the numerical aperture; and subtract a stored calibration intensity and the environment component from the measurement of intensity of the reflection of the light beam to obtain the calibrated intensity measurement, the stored calibration intensity corresponding to the proximal end component.

* * * * *